Patented Jan. 5, 1943

2,307,643

UNITED STATES PATENT OFFICE 2,307,643

PROCESS FOR THE PRODUCTION OF A CYANO-IMINO COMPOUND

Frank Kerr Signaigo, Wilmington, Del., assignor to E. I. du Pont de Nemours & Company, Wilmington, Del., a corporation of Delaware No Drawing. Application May 31, 1940, Serial No. 338,228

12 Claims. (Cl. 260—464)

This invention relates to improvements in the preparation of cyano-imino compounds by condensation of nitriles.

It has been reported that nitriles can be condensed to cyano-imino compounds by means of sodium or sodium ethoxide. The yields of cyano-imines obtained by those prior art methods, however, are low. Nitriles have also been condensed to cyano-imines by means of alkali metal-alkyl or aryl amides, e. g., bromo-magnesium diethyl amide, sodium isoamylanilide, lithium dicyclohexyl amide, etc. These reagents, however, are costly.

It is an object of this invention to provide a commercially practical process for the production of cyano-imino compounds. Another object is to provide a process that will give high yields of cyano-imino compounds. Still another object is to provide an inexpensive process for the production of cyano-imino compounds. Other objects will be apparent from the following description of the invention.

These objects are accomplished by the following process which comprises bringing at least one organic nitrile having at least one hydrogen atom on a carbon atom alpha to the nitrile group into contact with a solution of an alkali metal-polycylic aromatic hydrocarbon addition compound at a temperature between —25° and +30° C., whereby a cyano-imino compound is formed. In practicing this invention a solution of alkali metal-polycyclic aromatic hydrocarbon addition compound is prepared by dissolving the metal in a solution of the polycyclic aromatic hydrocarbon in a solvent such as dimethyl glycol ether at a temperature of 0° to 20° C. To the stirred solution of alkali metal addition compound which is maintained at a temperature of 0° C. to 20° C. is added gradually two moles of a mononitrile or one mole of a dinitrile for each gram atom of metal in solution. The reaction is complete when the alkali metal-polycyclic aromatic hydrocarbon complex has been substantially all used up. This is conveniently determined by measuring the specific conductivity of the solution, which changes in proportion to the concentration of alkali metal-polycyclic hydrocarbon complex present. One equivalent of water is then added to decompose the metal salt of the cyano-imine formed and the solution of products is filtered to separate the precipitated alkali metal hydroxide. The free cyano-imine is then isolated from the reaction mixture by fractional distillation, crystallization, or solvent extraction.

All materials used in the process of this invention are of anhydrous grade. The following examples are submitted by way of illustration and not as limiting the invention. Unless otherwise stated, parts are by weight.

Example I

11 - cyano - 12 - iminotricosane was prepared from lauronitrile as follows. A solution of sodium naphthalene was prepared by adding in portions, 25 parts of metallic sodium to a solution of 128 parts of naphthalene in 800 parts of anhydrous dimethyl glycol ether. The mixture was stirred continuously and the temperature was maintained at 0° to 5° C. by means of a cooling bath of methanol and solid carbon dioxide. A slow stream of dry, deoxygenated nitrogen was passed through the reactor to prevent the access of moisture and air which readily destroy the sodium naphthalene compound. The formation of the green solution of sodium naphthalene compound was followed by measuring the conductivity of the solution from time to time. The specific conductivity gradually changed from 0.0 to 12.0 millimhos in the course of two hours, after which no further change occurred indicating that no additional sodium naphthalene was being formed. The stirred solution was then maintained at 0° to 5° C. while 362 parts of lauronitrile was added during the course of two hours. The specific conductivity of the solution decreased gradually during this period from 12.0 to 0.45 millimhos after which time the reaction mixture was allowed to warm to room temperature. Thirty-six parts of water was added to the stirred solution and the precipitated sodium hydroxide filtered from the reaction mixture. The dimethyl glycol ether solvent was removed by distillation under a pressure of 100 mm. and the residue further distilled at a pressure of 3 mm. The following fractions were obtained:

| Fraction | B. P./3 mm. | Amount | Description |
|---|---|---|---|
| 1 | °C. 65–106 | Parts | Naphthalene+dihydronaphthalene. |
| 2 | 106–155 | 20 | Lauronitrile. |
| 3 | 216–220 | 290 | Cyano-iminotricosane. |
| 4 | Residue | 47 | |

The yield of crude 11-cyano-12-iminotricosane was 80.2% of the theoretical. On redistillation pure cyano-imine was obtained as a viscous oil boiling at 210° to 215° C. at 2½ to 3 mm. pressure.

The product contained 7.6% nitrogen. The theoretical value for 11-cyano-12-iminotricosane is 7.7%.

*Example II*

3-iminobutyronitrile was prepared as follows: 51.2 parts of naphthalene was dissolved in 350 parts of anhydrous dimethyl glycol ether in a closed, nitrogen-filled reactor, and cooled to 5° C. Two and eight-tenths parts of metallic sodium was then added and the solution stirred until the dark green color characteristic of sodium naphthalene developed. Thirty-two parts of acetonitrile and an additional 6.7 parts of metallic sodium were added alternately in portions so as to keep the specific conductivity of the solution between 1.0 and 10 millimhos. The addition of reactants required approximately 3 hours after which the color of the solution became red brown. The solution was then allowed to warm to room temperature. Eight parts of water was added with stirring and the solution filtered to separate the precipitated sodium hydroxide. The dimethyl glycol ether solvent was removed by distillation at reduced pressure and the residue stirred with 400 parts of petroleum ether to dissolve out the naphthalene and dihydronaphthalene. The solid which remained undissolved was filtered off and dried. Twenty-four parts of crude 3-iminobutyronitrile was thus obtained. After recrystallization from benzene, the product melted at 65° to 72° C.

*Example III*

A cyclic cyano-imine was prepared from a dinitrile as follows: Two hundred fifty-six parts of naphthalene was dissolved in 1600 parts of anhydrous dimethyl glycol ether in a nitrogen-filled reaction vessel. To the stirred solution, cooled to 0° C., was added 14 parts of sodium chips. After 45 minutes the solution showed a specific conductivity of 10 millimhos. During 2 hours, 90 parts of adipic acid dinitrile was added continuously with stirring and when the conductivity had decreased to 1.4 millimhos, 13 parts more of sodium was added. The alternate addition of sodium and adiponitrile was continued at a rate such that the conductivity of the solution was maintained in the neighborhood of one millimho until a total of 48 parts of metallic sodium and 216 parts of adiponitrile had been added. After 6 hours, the conductivity of the reaction mixture had decreased to 0.067 millimho. Seventy-two parts of water was then added during 15 minutes and the solution was filtered to separate the precipitated sodium hydroxide. The dimethyl glycol ether solvent was removed by distillation at 100 mm. pressure and the solid residue was treated with 400 parts of boiling benzene and cooled. The insoluble crystalline product was filtered from the benzene solution of naphthalene and dihydronaphthalene. One hundred seventy-two parts of pure 1-cyano-2-imino-cyclopentane melting at 147° to 147½° C. was thus obtained. The yield was 80% of the theoretical.

The foregoing examples describe the use of the sodium addition compound of naphthalene as the alkali metal-polycyclic aromatic hydrocarbon derivative for condensing nitriles. This is the preferred alkali metal-polycyclic aromatic hydrocarbon compound because of the low cost of sodium and naphthalene and also because it is readily formed. However, the addition compounds of other alkali metals with other polycyclic aromatic hydrocarbons such as diphenyl anthracene, acenaphthene, and the like are also effective agents for condensing nitriles to cyanoimines. In preparing these alkali metal addition compounds of polycyclic aromatic hydrocarbons it is essential to use as solvents those described in U. S. Patents 2,027,000 and 2,019,832. Examples of these, in addition to the dimethyl glycol ether previously mentioned, are dimethyl ether, methyl ethyl ether, methyl ethyl ether of ethylene glycol, ethylene glycol diethyl ether, ethylene glycol methyl ether, ethylene glycol butyl ether, ethylene glycol formal, glycerol formal methyl ether, the simple tri ethers of glycerol, dioxan, and many others with similar properties which will function as solvents for the alkali metal intermediates, and also mixtures of these ethers with other ethers which are not effective in promoting reaction between the alkali metal and the polycyclic aromatic hydrocarbon; e. g., diethyl ether, methyl benzyl ether, etc. The monoethers which have been found effective in promoting the reaction between the alkali metal and the polycyclic aromatic hydrocarbons, with the exception of the cyclic ethers, are characterized as aliphatic ethers having a $CH_3$—O group and which have an oxygen-carbon ratio of not less than 1:4.

The process of this invention is applicable to the condensation of other nitriles in addition to those already described. Simple aliphatic nitriles that may be condensed are propionitrile, butyronitrile, valeronitrile, capronitrile, caprylonitrile, palmitonitrile, stearonitrile, phenylacetonitrile, and the like. Alicyclic nitriles as, for example, cyanocyclohexane and nitriles derived from naphthenic acids may also be condensed. In addition to mononitriles, the invention is also applicable to the condensation of di- and polynitriles. As examples of nitriles of this class may be mentioned malononitrile, succinonitrile, pimelonitrile, suberonitrile, sebaconitrile, polyacrylonitrile, and polymethacrylonitrile. Dinitriles having the cyano groups separated by 4 or 5 carbon atoms in contiguous relation readily undergo condensation under the conditions described herein with the formation of monomeric cyclic cyano-imines as described in Example III. When the nitrile groups are separated by 6 or more carbon atoms in contiguous relation, polymeric cyano-imines are produced. However, if the nitrile, in a state of high dilution, is brought into contact with the alkali metal-polycyclic aromatic hydrocarbon solution, then a substantial amount of the monomeric or dimeric cyclic cyano-imine is obtained.

Unsaturated nitriles, such as acrylonitrile, methacrylonitrile, oleonitrile, etc., may likewise be condensed by the process of this invention to unsaturated cyano-imines. The process described herein is also applicable to the preparation of cyano-imines by condensing mixtures of nitriles, in which case it is only necessary that one-half of the mixture of nitriles consist of nitrile containing a hydrogen atom on a carbon atom alpha to the nitrile group. For example, a solution of alkali metal-polycyclic aromatic hydrocarbon compound and a tertiary or aromatic nitrile—AR—CN (the latter having no active hydrogen atom will not condense with itself) reacts with a nitrile having the formula

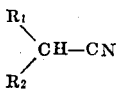

under the conditions already set forth to give substantial amounts of a cyano-imine having the following formula:

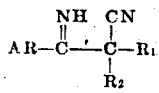

The nitriles condensed according to this invention may also contain other functional groups as, for example, carboxyl, hydroxyl, amino, and the like. In these cases, however, one equivalent of alkali metal in the alkali metal-polycyclic aromatic hydrocarbon complex will be used up by the formation of the alkali metal derivatives of these functional groups and a correspondingly larger amount of alkali metal addition compound will then be necessary to effect the condensation reaction. On hydrolysis of the product the cyano-imine compound containing the original functional group will be regenerated from the alkali metal salt.

As indicated in some of the foregoing examples, the process of this invention is conveniently carried out by first preparing a solution of the alkali metal-polycyclic aromatic hydrocarbon compound and then adding the nitrile thereto. Other modes of bringing the two reactants into contact, however, are also effective. For example, the nitrile and the solution of alkali metal addition compound may be run simultaneously into a mutual solvent, preferably one of the solvents suitable for preparing the alkali metal addition compound. Or a solution of the alkali metal-polycyclic aromatic hydrocarbon addition product may be run into the nitrile or a solution of the nitrile in a mutual solvent. Alternatively, the condensation may be brought about by first forming a solution of alkali metal-polycyclic aromatic hydrocarbon addition product and then reacting this with an equivalent amount of nitrile followed by further alternate addition of alkali metal and nitrile, thus enabling a relatively large amount of nitrile to be condensed under conditions approaching constant concentration of alkali metal-polycyclic aromatic hydrocarbon addition compound. It is preferable that the reaction mixture be stirred while the reactants are brought into contact.

The relative ratio of reactants employed is preferably one gram atom of alkali metal in the form of its polycyclic aromatic hydrocarbon addition product for each two equivalents of cyano groups. However, as indicated above, if certain other functional groups such as the hydroxyl group are present, an additional amount of alkali metal will be needed. The amount of solvent employed is conveniently from 1 to 2 liters for each mole of alkali metal polycyclic aromatic hydrocarbon compound used. However, as previously indicated, if it is desired to prepare monomeric cyclic cyano-imines from dinitriles containing more than 5 carbon atoms in contiguous relation between the nitrile groups, it is preferable to use a higher ratio of solvent to nitrile. The preferred solvents are those solvents which are necessary to the formation of the alkali metal-hydrocarbon addition compounds. These solvents may, however, be diluted with three or four times their volume of inert solvent, if desired.

According to U. S. 2,171,869, when an alkali metal polycyclic hydrocarbon addition compound is allowed to react with a nitrile, the product obtained is an alkali metal derivative of the nitrile. It has now been discovered that the reaction between nitriles and alkali metal polycyclic hydrocarbon addition compounds is very complex and that the nature of the main product obtained is determined by the particular temperature conditions employed. Thus at very low temperatures alkali metal derivatives of the nitriles are obtained as described in U. S. 2,171,869. As the temperature is progressively raised, however, the main product of the reaction, instead of being the alkali metal derivative of the nitrile, is the cyano-imine. This is a reaction the existence of which could not have been predicted from anything in the art and represents a unique and unexpected discovery. As the temperature is increased further a third reaction occurs, namely, that between the alkali metal polycyclic hydrocarbon addition compound and the ether solvent. Consequently, in the practice of this invention to produce the cyano-imine in maximum yield and at a practical rate, it is essential that the reaction be carried out at a temperature which is high enough for cyano-imine formation and yet low enough that the alkali metal polycyclic hydrocarbon addition product does not react appreciably with the ether solvent. Generally, temperatures within the range from −25 to +30° C. are satisfactory and preferably temperatures between 0° and 25° C. are employed.

The cyano-imines obtained by the process of this invention are useful as intermediates for the preparation of important organic compounds. For example, they may be converted to ketoesters which are useful as plasticizers or they may be hydrolyzed to ketones, those of the many-membered ring series being useful as perfumes. The cyclic cyano-imines may be considered of possible interest as dye intermediates.

It is apparent that many widely different embodiments of this invention may be made without departing from the spirit and scope thereof and therefore the invention is not intended to be limited except as indicated in the appended claims.

I claim:

1. The process for the production of a cyano-imino compound which comprises reacting in solution at a temperature between −25° C. and +30° C. an alkali metal addition compound of a polycyclic aromatic hydrocarbon with an organic nitrile having at least one hydrogen atom on a carbon atom alpha to the nitrile group.

2. The process in accordance with claim 1 characterized in that the reaction is carried out at a temperature between 0° and +25° C.

3. The process in accordance with claim 1 characterized in that the alkali metal addition compound is the sodium addition compound of naphthalene.

4. The process in accordance with claim 1 characterized in that the nitrile is an aliphatic mononitrile.

5. The process in accordance with claim 1 characterized in that the nitrile is an aliphatic dinitrile.

6. The process in accordance with claim 1 characterized in that the nitrile is a straight chain aliphatic alpha-omega-dinitrile having from 6 to 10 carbon atoms.

7. The process in accordance with claim 1 characterized in that the nitrile is a straight chain aliphatic mononitrile.

8. The process for the production of a cyano-imino compound which comprises reacting at a temperature between −25° C. and +30° C. an alkali metal addition compound of a polycyclic aromatic hydrocarbon in an ether solvent with an aliphatic dinitrile in which the nitrile groups are separated by at least 6 carbon atoms in contiguous relation.

9. The process in accordance with claim 8 wherein the nitrile is in a state of high dilution thereby increasing the yield of cyclic cyanoimines obtained.

10. The process for the production of a cyanoimino compound which comprises reacting in solution at a temperature between −25° C. and +30° C. an alkali metal addition compound of a polycyclic aromatic hydrocarbon with a mixture of nitriles containing at least one nitrile having a hydrogen atom on a carbon atom adjacent to the nitrile group and at least one nitrile having a tertiary nitrile group.

11. The process for the production of a cyanoimine compound which comprises reacting in solution at a temperature between −25° C. and +30° C. an alkali metal addition compound of a polycyclic aromatic hydrocarbon with an organic nitrile having at least one hydrogen atom on a carbon atom alpha to the nitrile group, said temperature being high enough that the cyanoimino compound is formed at a practical rate and yet low enough that the alkali metal polycyclic hydrocarbon addition product does not react appreciably with the ether solvent.

12. The process for the production of a cyanoimino compound which comprises reacting at a temperature between −25° C. and +30° C. an alkali metal addition compound of a polycyclic aromatic hydrocarbon in an ether solvent with adiponitrile.

FRANK KERR SIGNAIGO.